(12) United States Patent
Wang (10) Patent No.: US 9,825,859 B2
(45) Date of Patent: Nov. 21, 2017

(54) ITEM AGGREGATION IN SHORTEST PATH BRIDGING MAC-IN-MAC MODE (SPBM) NETWORK

(71) Applicant: Hangzhou H3C Technologies Co., Ltd., Hangzhou (CN)

(72) Inventor: Wei Wang, Beijing (CN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 58 days.

(21) Appl. No.: 14/649,491

(22) PCT Filed: Jan. 22, 2014

(86) PCT No.: PCT/CN2014/071072
§ 371 (c)(1),
(2) Date: Jun. 3, 2015

(87) PCT Pub. No.: WO2014/114228
PCT Pub. Date: Jul. 31, 2014

(65) Prior Publication Data
US 2015/0358233 A1 Dec. 10, 2015

(30) Foreign Application Priority Data
Jan. 22, 2013 (CN) .......................... 2013 1 0025237

(51) Int. Cl.
*H04L 12/46* (2006.01)
*H04L 12/741* (2013.01)
(Continued)

(52) U.S. Cl.
CPC ............ *H04L 45/745* (2013.01); *H04L 45/02* (2013.01); *H04L 61/2015* (2013.01);
(Continued)

(58) Field of Classification Search
None
See application file for complete search history.

(56) References Cited

U.S. PATENT DOCUMENTS

2008/0186965 A1* 8/2008 Zheng ................. H04L 12/4633
370/389
2009/0310481 A1* 12/2009 Deng .................... H04L 12/437
370/223
(Continued)

FOREIGN PATENT DOCUMENTS

CN 101060498 C 10/2007
CN 101692646 B 4/2010
(Continued)

OTHER PUBLICATIONS

International Search Report and Written Opinion dated Apr. 3, 2014 issued on PCT Patent Application No. PCT/CN2014/071072 dated Jan. 22, 2014, The State Intellectual Property Office, P.R. China.

*Primary Examiner* — Duc Duong
(74) *Attorney, Agent, or Firm* — Hewlett Packard Enterprise Patent Department (57) ABSTRACT

According to an example, when transmitting MAC forwarding table items to other BEB devices in an SPBM network for synchronization, a BEB device aggregates a plurality of MAC forwarding table items in a MAC forwarding table belonging to a same MAC segment into an aggregated MAC forwarding item, and transmits the aggregated MAC forwarding table item to the other BEB devices.

15 Claims, 5 Drawing Sheets

(51) Int. Cl.
*H04L 12/751* (2013.01)
*H04L 29/12* (2006.01)

(52) U.S. Cl.
CPC ...... *H04L 61/6013* (2013.01); *H04L 61/6022* (2013.01); *H04L 61/2038* (2013.01)

(56) References Cited

U.S. PATENT DOCUMENTS

| | | | |
|---|---|---|---|
| 2011/0292939 A1 | 12/2011 | Subramaian | |
| 2011/0317703 A1* | 12/2011 | Dunbar | H04L 12/462 370/392 |
| 2012/0243539 A1* | 9/2012 | Keesara | H04L 45/66 370/392 |
| 2012/0327938 A1* | 12/2012 | Song | H04L 45/66 370/392 |
| 2013/0294451 A1* | 11/2013 | Li | H04L 45/66 370/392 |
| 2013/0329728 A1* | 12/2013 | Ramesh | H04L 12/462 370/390 |
| 2014/0010234 A1* | 1/2014 | Patel | H04L 45/74 370/392 |

FOREIGN PATENT DOCUMENTS

| | | |
|---|---|---|
| CN | 101938377 B | 1/2011 |
| CN | 102318290 | 1/2012 |

\* cited by examiner

ITEM AGGREGATION IN SHORTEST PATH BRIDGING MAC-IN-MAC MODE (SPBM) NETWORK

CLAIM FOR PRIORITY

The present application is a national stage filing under 35 U.S.C 371 of PCT application number PCT/CN2014/071072, having an international filing date of Jan. 22, 2014, which claims priority to Chinese patent application number 201310025237.0 having a filing date of Jan. 22, 2013, the disclosures of which are hereby incorporated by reference in their entireties.

BACKGROUND

Shortest path bridging (SPB) is an Ethernet standard defined by Institute of Electrical and Electronics Engineers (IEEE) 802.1aq.

Shortest path bridging Mac-in-Mac mode (SPBM) is a mode of the SPB. In an SPBM network, a backbone network includes devices such as a backbone edge bridge (BEB), a backbone core bridge (BCB) and backbone lines connecting these devices.

In the SPBM network, after receiving an Ethernet packet via a user-side interface connecting with a user network, the BEB device searches a media access control (MAC) forwarding table for a matching item according to a target C-MAC address (the C-MAC address is a MAC address of a host in a remote user network) in the Ethernet packet. In the matching item searched out, an out-port is an SPBM tunnel port. The BEB device performs an M-in-M encapsulation of the Ethernet packet according to information included in the SPBM tunnel port to obtain an M-in-M packet, and then forwards the M-in-M packet via a physical out-port.

BRIEF DESCRIPTION OF THE DRAWINGS

Features of the present disclosure are illustrated by way of example and not limited in the following figure(s), in which like numerals indicate like elements, in which.

DETAILED DESCRIPTION

Hereinafter, the present disclosure is described in further detail with reference to the accompanying drawings and examples.

For simplicity and illustrative purposes, the present disclosure is described by referring to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on. In addition, the terms "a" and "an" are intended to denote at least one of a particular element.

In an example of the present disclosure, during a procedure that a client applies for an IP address to an address assigning server, besides assigning an IP address to the client, the address assigning server further assigns a proxy MAC address to the client according to a predefined assigning rule. Thereafter, after receiving an Ethernet packet of the client, an access layer switch replaces a sender MAC address of the Ethernet packet with the proxy MAC address before forwarding the Ethernet packet. Thus, when the Ethernet packet of the client arrives at a BEB device via the access layer switch, the sender MAC address of the Ethernet packet is the proxy MAC address of the client. If the proxy MAC address is unknown to the BEB device, the BEB device adds a MAC forwarding item containing the proxy MAC address in a MAC forwarding table. For example, the MAC address learnt by the BEB device from a local user network is the proxy MAC address. In addition, before transmitting MAC forwarding items to other BEB devices for synchronization, the BEB device aggregates a plurality of MAC forwarding items belonging to the same MAC address segment in the MAC forwarding table into an aggregated MAC forwarding table item. The MAC address in the aggregated MAC table item is an aggregated MAC address. Thus, the MAC forwarding table of the BEB device includes MAC forwarding table items containing proxy MAC addresses of the local user network and MAC forwarding table items containing aggregated MAC addresses of remote user networks. Since the large amount of MAC forwarding table items in the remote user networks are aggregated into several aggregated MAC forwarding table items, the number of the MAC forwarding table items in the BEB device is reduced, which shortens the time for searching the MAC forwarding table, increases searching efficiency and extends access capacity of the backbone network.

In the examples of the present disclosure, the address assigning server may be a dynamic host configuration protocol (DHCP) server.

Figure 1:
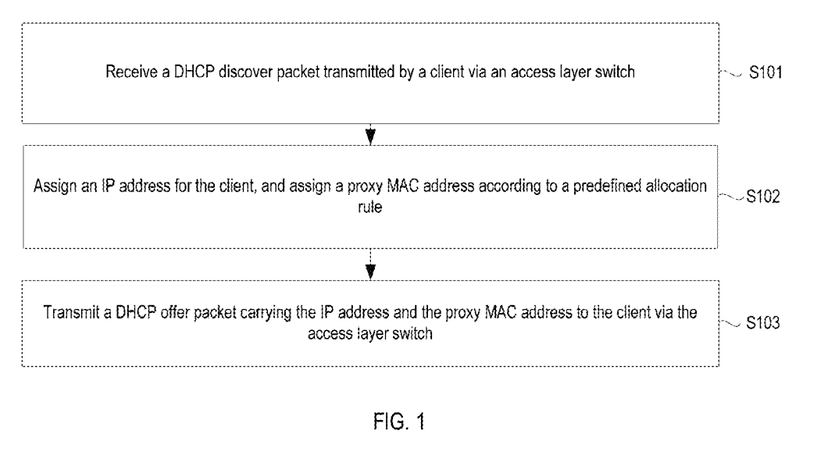
FIG. 1 is a flowchart illustrating a procedure of a client applying for an IP address to an address assigning server according to an example of the present disclosure.

FIG. 1 is a flowchart illustrating a procedure of a client applying for an IP address to an address assigning server according to an example of the present disclosure. As shown in FIG. 1, the method includes the following.

At block S101, an address assigning server receives a DHCP discover packet transmitted by the client via an access layer switch.

At block S102, the address assigning server assigns an internet packet (IP) address to the client, and also assigns a proxy MAC address to the client according to a predefined assigning rule.

The predefined assigning rule may include: assigning proxy MAC addresses belonging to the same MAC address segment to clients in the same user network. The MAC address segment may be a network segment. Other assigning rules may be configured and may be based on practical requirements. The configuration of the assigning rule is not restricted in the present disclosure.

At block S103, the address assigning server transmits a DHCP offer packet carrying the IP address and the proxy MAC address to the client via the access layer switch. After receiving the DHCP offer packet transmitted by the address assigning server via the access layer switch, the client does not process the proxy MAC address carried in the DHCP offer packet. Alternatively, before forwarding the DHCP offer packet to the client, the access layer switch may remove the proxy MAC address carried in the DHCP offer packet. Thus, the DHCP offer packet forwarded to the client does not contain the proxy MAC address.

Through the above blocks S101-S103, the access layer switch may know the IP address and the proxy MAC address of the client through listening to packets exchanged between the client and the address assigning server.

The access layer switch listens to protocol packets exchanged between the client and the address assigning server during the IP address applying procedure. According to the listened protocol packets, an item corresponding to the client is added in a client information table at the access layer switch. The client information table includes: an original MAC address of the client, an identifier of a port via which the protocol packets transmitted by the client are received (i.e., the identifier of an in-port of the protocol packets transmitted by the client), the IP address and proxy MAC address assigned by the address assigning server. In one example, the IP address and proxy MAC address are selected by the client.

The client information table stores information of each client connected with the access layer switch.

For example, the format of the client information table may be as shown in table 1 or table 2.

TABLE 1

| Original MAC address | Port identifier | IP address | Proxy MAC address |
| --- | --- | --- | --- |

TABLE 2

| Original MAC address | Port identifier | VLAN ID | IP address | Proxy MAC address |
| --- | --- | --- | --- | --- |

The client information table may use other formats. Besides contents in table 1 and table 2, the client information table may further include other content, which is not restricted in the present disclosure. In a practical application, the port identifier may be a port number.

Suppose that the original MAC address of client 1 is 2345-8340-2231; the port identifier of the port via which the access layer switch receives the protocol packet transmitted by client 1 is PORT1; and the IP address and the proxy MAC address assigned by the address assigning server selected by the client 1 are respectively 1.1.1.1 and 0000-1111-0001. Thus, after the item corresponding to the client 1 is added in the client information table as shown in table 1 or table 2, the updated client information able is as shown in table 3 or table 4.

TABLE 3

| Original MAC address | Port identifier | IP address | Proxy MAC address |
| --- | --- | --- | --- |
| 2345-8340-2231 | PORT1 | 1.1.1.1 | 0000-1111-0001 |

TABLE 4

| Original MAC address | Port identifier | VLAN ID | IP address | Proxy MAC address |
| --- | --- | --- | --- | --- |
| 2345-8340-2231 | PORT1 | VLAN 1 | 1.1.1.1 | 0000-1111-0001 |

Figure 2:
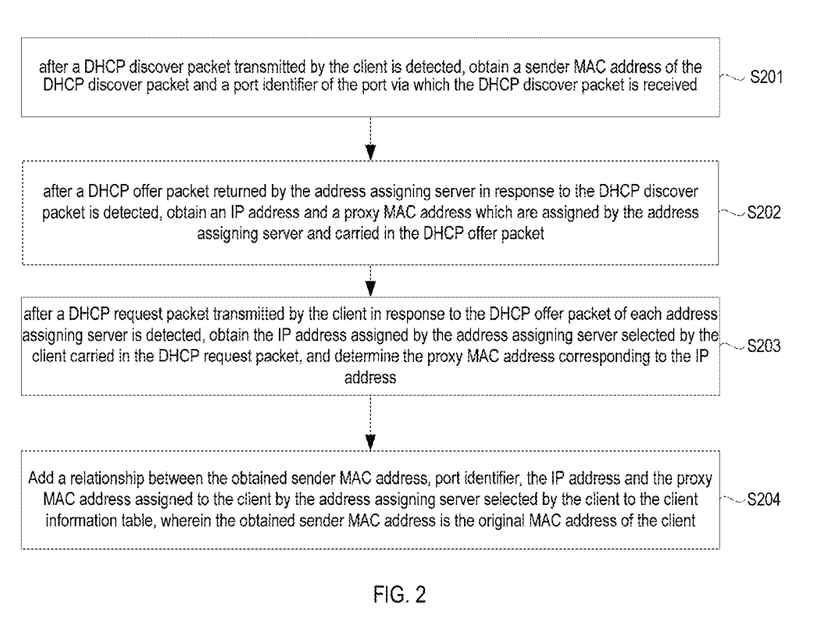
FIG. 2 is a flowchart illustrating operations of an access layer switch during the procedure of the client applying for the IP address to the address assigning server according to an example of the present disclosure.

If the address assigning server is a DHCP server and the above protocol packets are DHCP packets, operations of the access layer switch during the procedure of the client applying for the IP address to the DHCP server may include the following blocks S201-S204, as shown in FIG. 2.

At block S201, after a DHCP discover packet transmitted by the client is detected, a sender MAC address of the DHCP discover packet and a port identifier of the port via which the DHCP discover packet is received are obtained.

The sender MAC address of the DHCP discover packet is the original MAC address of the client.

At block S202, after a DHCP offer packet returned by the address assigning server in response to the DHCP discover packet is detected, an IP address and a proxy MAC address which are assigned by the address assigning server and carried in the DHCP offer packet are obtained.

At blocks S201 and S202, operations of the address assigning server are described above with respect to blocks S101-S103 and are not repeated herein.

There may be several address assigning servers receiving the DHCP discover packet of the client and performing the above blocks S101-S103. Therefore, each of these address assigning servers returns to the client a DHCP offer packet carrying an IP address and a proxy MAC address assigned to the client via the access layer switch. The access layer switch obtains IP addresses and proxy MAC addresses assigned by these address assigning servers to the client.

At block S203, after a DHCP request packet transmitted by the client in response to the DHCP offer packet of an address assigning server is detected, the IP address assigned by the address assigning server, which is carried in the DHCP request packet, is obtained. The proxy MAC address corresponding to the IP address is determined. If there are multiple address assigning servers and each sends a DHCP offer packet carrying an IP address assigned to the client, the client may select one of the address assigning servers and use the IP address assigned by the selected address assigning server. The client transmits the DHCP request packet carrying the selected IP address, which is the IP address assigned by the selected address assigning server.

The client may select the IP address carried in the first DHCP offer packet it receives. If the DHCP offer packet further carries a proxy MAC address, the client does not process the proxy MAC address carried in the DHCP offer packet. Thereafter, the client broadcasts a DHCP request packet carrying the IP address selected by the client. After receiving the DHCP request packet, the access layer switch may determine the IP address and the corresponding proxy MAC address selected by the client according to the IP address carried in the DHCP request packet, i.e., according to the IP addresses and proxy MAC addresses obtained in block S202.

At block S204, a relationship between the obtained sender MAC address, port identifier, the IP address and the proxy MAC address assigned to the client by the address assigning server selected by the client is added to the client information table, wherein the obtained sender MAC address is the original MAC address of the client.

Through the above blocks S201 to S204, the original MAC address of the client (i.e., the sender MAC address), the port identifier of the port via which the protocol packets transmitted by the client are received (i.e., the obtained port identifier), the IP address and the proxy MAC address assigned by the address assigning server selected by the client are obtained and are stored in the client information table.

The proxy MAC addresses of clients in the same user network may belong to the same MAC address segment.

Thereafter, if the access layer switch receives an Ethernet packet transmitted by the client, the access layer switch is capable of finding a proxy MAC address corresponding to the client and replacing a sender MAC address of the Ethernet packet with the proxy MAC address.

Figure 3:
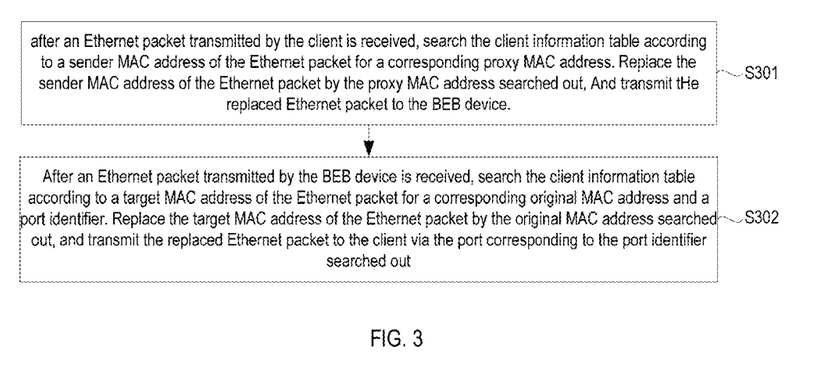
FIG. 3 is a flowchart illustrating an item aggregation method performed by the access layer switch in an SPBM network according to an example of the present disclosure.

FIG. 3 is a flowchart illustrating a method for item aggregation performed by an access layer switch in the SPBM network according to an example of the present disclosure. As shown in FIG. 3, the method includes the following.

At block S301, after an Ethernet packet transmitted by the client is received, the client information table is searched at the access layer switch according to a sender MAC address of the Ethernet packet for a corresponding proxy MAC address. The sender MAC address of the Ethernet packet is replaced by the proxy MAC address searched out. The replaced Ethernet packet is transmitted to the BEB device.

For example, the access layer switch receives an Ethernet packet transmitted by client 1 via PORT1. The sender MAC address of the Ethernet packet is 2345-8340-2231. The client information table as shown in table 3 or table 4 is searched according to the sender MAC address 2345-8340-2231 for a corresponding proxy MAC address. The proxy MAC address searched out is 0000-1111-0001. Thus, the sender MAC address 2345-8340-2231 of the Ethernet packet is replaced by 0000-1111-0001. Then the replaced Ethernet packet is transmitted out and arrives at the BEB device.

Based on the above block S301, the access layer switch replaces the sender MAC address of the Ethernet packet received from the client by the proxy MAC address, and then forwards the replaced Ethernet packet to the BEB device.

Similarly, after receiving an Ethernet packet destined to the client from the BEB device, the access layer switch replaces a target MAC address (i.e., the proxy MAC address) by the original MAC address of the client, and then forwards the replaced Ethernet packet to the client.

At block S302, after an Ethernet packet transmitted by the BEB device is received, the client information table is searched according to a target MAC address of the Ethernet packet for a corresponding original MAC address and a port identifier. The target MAC address of the Ethernet packet is replaced by the original MAC address identified from the lookup. The Ethernet packet is then transmitted to the client via the port corresponding to the port identifier searched out.

For example, the access layer switch receives an Ethernet packet transmitted by the BEB device. The target MAC address of the Ethernet packet is 0000-1111-0001. The client information table as shown in table 3 or table 4 is searched according to the address 0000-1111-0001 for a corresponding original MAC address and a port identifier. The original MAC address searched out is 2345-8340-2231 and the port identifier is PORT1. Thus, the target MAC address 0000-1111-0001 of the Ethernet packet is replaced by 2345-8340-2231. Then, the replaced Ethernet packet is transmitted via PORT1 and arrives at client 1.

Based on the above blocks S301-S302 performed by the access layer switch, it is known that the access layer switch replaces the sender MAC address or target MAC address of the Ethernet packet received according to the client information table and then forwards the replaced Ethernet packet.

Since the sender MAC address of the Ethernet packet has been replaced by the proxy MAC address according to the client information table, the MAC address learnt by the BEB device from a local user network is the proxy MAC address. Before transmitting MAC forwarding items to other BEB devices for synchronization, the BEB device aggregates a plurality of MAC forwarding items belonging to the same MAC address segment in the MAC forwarding table into an aggregated MAC forwarding table item. The MAC address in the aggregated MAC table item is an aggregated MAC address.

Figure 4:
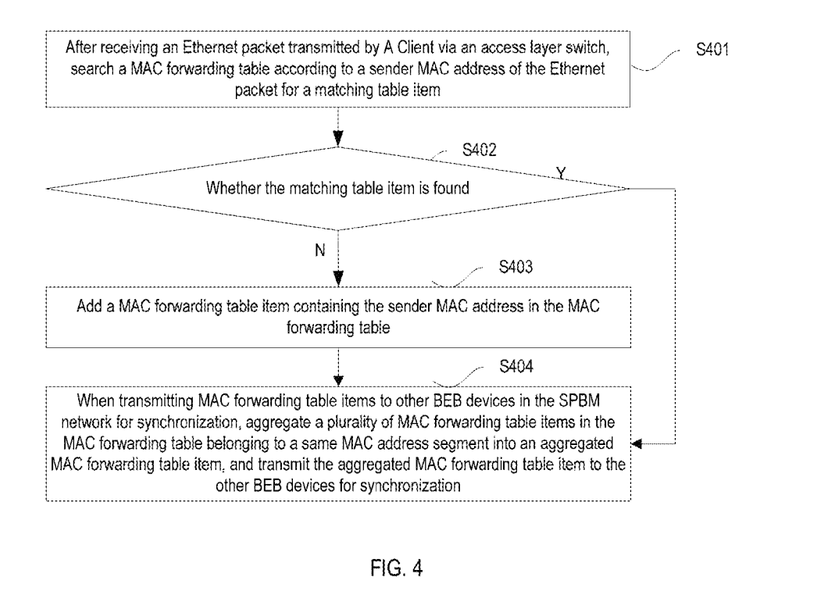
FIG. 4 is a flowchart illustrating an item aggregation method performed by a BEB device according to an example of the present disclosure.

FIG. 4 is a flowchart illustrating a method for item aggregation in the SPBM network performed by a BEB device according to an example of the present disclosure. As shown in FIG. 4, the method includes the following.

At block S401, after an Ethernet packet of a client transmitted by an access layer switch is received, a MAC forwarding table is searched according to a sender MAC address of the Ethernet packet for a matching item, wherein the sender MAC address of the Ethernet packet for example is a proxy MAC address assigned by an address assigning server selected by the client.

At block S402, if the matching table item is found, block S404 is performed; otherwise, block S403 is performed.

At block S403, a MAC forwarding table item including the sender MAC address is added in the MAC forwarding table.

Contents of the MAC forwarding table item may be similar to those in conventional MAC tables. The difference is that the MAC address in the table item is not the original MAC address of the client but the proxy MAC address.

At block S404, during synchronization of the MAC forwarding table item with other BEB devices in the SPBM network, a plurality of MAC forwarding table items belonging to the same MAC address segment are aggregated into an aggregated MAC forwarding table item. The aggregated MAC forwarding table item is transmitted to other BEB devices for synchronization. The MAC address in the aggregated MAC forwarding table item is an aggregated MAC address. In other words, before the MAC forwarding table items corresponding to MAC addresses learnt from the local user network are transmitted to other BEB devices, the items in the MAC forwarding table which meet the following condition are aggregated into an aggregated MAC forwarding table item. The aggregated MAC forwarding table item is transmitted. The condition includes: the MAC addresses (i.e., proxy MAC addresses) included in the plurality of MAC forwarding table items belong to the same MAC address segment. Besides the MAC addresses, other contents including out-ports of the plurality of items are the same.

The process of aggregating the multiple MAC forwarding table items belonging to the same MAC address segment into the aggregated MAC forwarding table item may include aggregating the proxy MAC addresses included in the multiple MAC forwarding table items into an aggregated MAC address. The MAC address in the aggregated MAC forwarding table item is the aggregated MAC address. Other contents of the aggregated MAC forwarding table item are contents of the plurality of forwarding table items except for the MAC addresses. Contents of the aggregated MAC forwarding table item may be similar to those in conventional techniques and are not repeated herein. The difference is that the MAC address in the aggregated MAC forwarding table item is the aggregated MAC address.

For example, MAC addresses (proxy MAC addresses) in three MAC forwarding table items to be synchronized in the MAC forwarding table are respectively: 0000-1111-0001, 0000-1111-0012 and 0000-1111-0023. These three MAC addresses belong to the same MAC address segment. Thus, the three MAC forwarding table items may be aggregated into one aggregated MAC forwarding table item. The MAC address in the aggregated MAC forwarding table item is an aggregated MAC address obtained by aggregating the three MAC addresses, e.g.: 0000-1111-0000/32.

For example, aggregating the MAC addresses may comprise determining the common bits of the MAC addresses to be aggregated and then applying a mask to exclude the other bits, e.g. setting the remaining bits to zero followed by a slash and number indicating the number of common bits.

For example, the MAC addresses may be expressed in a hexadecimal format. During the aggregation, the MAC addresses may be converted into a binary format and aligned in a list, i.e., each MAC address is converted into 48 bits. The bits at which the common pattern of digits ends are located. The number of common bits is counted. The aggregated MAC address is found by setting the remaining bits to zero. It is followed by a slash and then the number of common bits. In this example, the above three MAC addresses have 42 common bits. According to a practical requirement, e.g., in order to contain more MAC addresses other than the above three MAC addresses in the aggregated MAC address, the figure after the slash (i.e., the number of common bits) may be configured to be smaller than 42, e.g., 32.

In one example, the BEB device may perform the synchronization of the MAC forwarding table items periodically, i.e., perform block S404 periodically. In addition, the aggregated MAC forwarding table item may be synchronized to other BEB devices via an intermediate system-to-intermediate system (IS-IS) packet.

The proxy MAC addresses of clients in the same user network belong to the same MAC address segment. Therefore, all MAC forwarding table items belonging to the same MAC address segment in the MAC forwarding table may be aggregated into one MAC forwarding table item.

Through the above blocks S401-S403, the MAC addresses of the local user network learnt by the BEB device are proxy MAC addresses but not original MAC addresses of the clients. Through the above block S404, before transmitting the table items corresponding to the proxy MAC addresses learnt from the local user network to other BEB devices, the BEB device aggregates multiple MAC forwarding table items belonging to the same MAC address segment into one aggregated MAC forwarding table item. Thus, it is unnecessary to transmit each MAC forwarding table item to other BEB devices. It is only required to synchronize the aggregated MAC forwarding table item. The amount of the MAC forwarding table items to be synchronized is reduced. Accordingly, the number of MAC forwarding table items of remote user networks that the other BEB devices need to learn is also reduced. The number of MAC forwarding table items to be configured is reduced.

In addition, the BEB device may also receive an aggregated MAC forwarding table item transmitted by another BEB device via an IS-IS packet. At this time, the BEB device searches a MAC forwarding table according to an aggregated MAC address in an aggregated MAC forwarding table item for a matching item. If there is no matching item, the BEB device adds a MAC forwarding table item corresponding to the aggregated MAC address in the MAC forwarding table.

The contents of the added MAC forwarding table item may be similar to those in conventional technique and are not repeated herein. The difference is that the MAC address in the added MAC forwarding table item is the aggregated MAC address.

Based on the above blocks S401-S403, the MAC address in the MAC forwarding table is not the original MAC address of the client but instead is the proxy MAC address and the aggregated MAC address.

The packet forwarding procedure of the BEB device is similar to that in the conventional technique, i.e., searching the MAC forwarding table and forwarding according to the MAC forwarding table. The forwarding procedure is not described herein.

Figure 5:
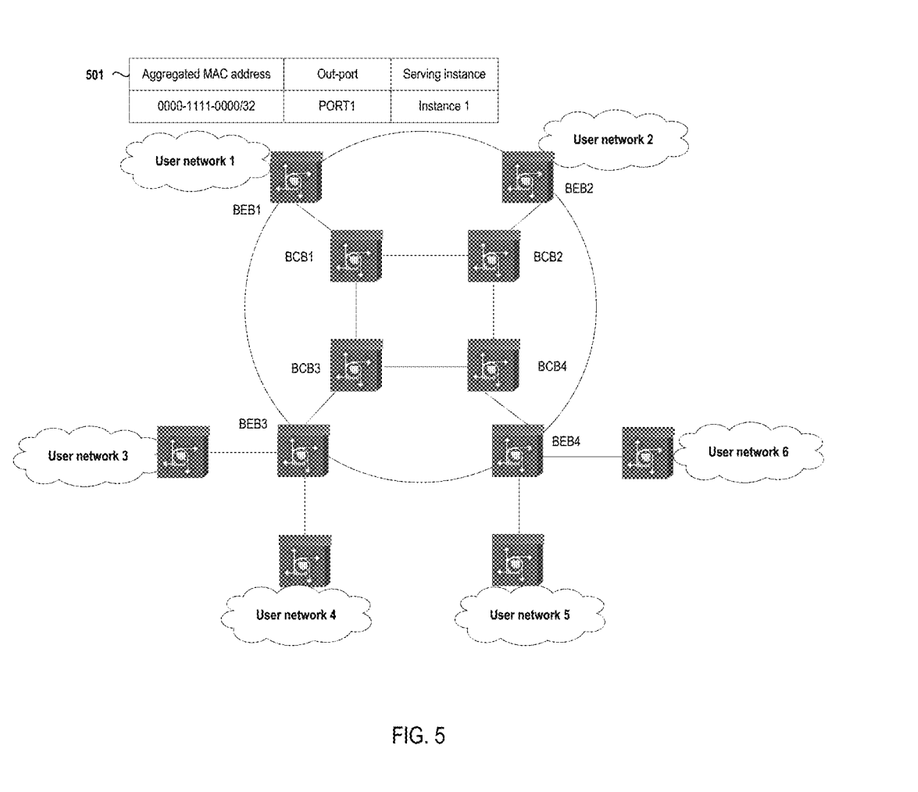
FIG. 5 is a schematic diagram illustrating a structure of an SPBM network according to an example of the present disclosure.

Hereinafter, the SPBM network as shown in FIG. 5 is taken as an example to describe the processing of the above examples. In the SPBM network of FIG. 5, BEB 1 connects to user network 1, BEB 2 connects to user network 2, BEB 3 connects to user networks 3 and 4. BEB 4 connects to user networks 5 and 6. Each of the user networks 1-6 includes: an access layer switch and clients connected with the access layer switch, and an address assigning server (not shown in the figure).

Suppose that the address assigning server is a DHCP server.

Client 1 in user network 1 broadcasts a DHCP discover packet, wherein a sender MAC address of the DHCP discover packet is 2345-8340-2231. After receiving the DHCP discover packet, the access layer switch stores the sender MAC address 2345-8340-2231 of the DHCP discover packet and a port number PORT1 of a port via which the DHCP discover packet is received. The access layer switch forwards the DHCP discover packet.

After receiving the DHCP discover packet of client 1, DHCP server 1 selects an IP address 1.1.1.1 according to an IP address assigning rule. DHCP server 1 also assigns a proxy MAC address 0000-1111-0003 to the client. DHCP server 1 transmits a DHCP offer packet carrying the IP address 1.1.1.1 and the proxy MAC address 0000-1111-0003 to client 1. After receiving the DHCP offer packet, the access layer switch obtains the IP address 1.1.1.1 and the proxy MAC address 0000-1111-0003 carried in the DHCP offer packet.

Similarly, DHCP server 2 also receives the DHCP discover packet of client 1. DHCP server 2 assigns an IP address 1.1.1. 151 according to an IP address assigning rule and assigns a proxy MAC address 0000-1111-0032 to client 1. DHCP server 2 transmits a DHCP offer packet carrying the IP address 1.1.1.151 and the proxy MAC address 0000-1111-0032 to client 1. After receiving the DHCP offer packet, the access layer switch obtains the IP address 1.1.1.151 and the proxy MAC address 0000-1111-0032 carried in the DHCP offer packet.

Thus, the access layer switch obtains the following addresses: 1.1.1.1 and 0000-1111-0003; and 1.1.1.151 and 0000-1111-0032.

Client 1 accepts the first DHCP offer packet it received. Suppose that the first DHCP offer packet the client received is the DHCP offer packet transmitted by DHCP server 1. Thus, client 1 broadcasts a DHCP request packet carrying the IP address 1.1.1.1 contained in the DHCP offer packet of DHCP server 1. After receiving the DHCP request packet, the access layer switch searches for a proxy MAC address corresponding to the IP address 1.1.1.1 carried in the DHCP request packet. The proxy MAC address searched out is 0000-1111-0003. A table item corresponding to client 1 is added in the client information table, as shown in table 5.

TABLE 5

| Original MAC address | Port identifier | VLAN ID | IP address | Proxy MAC address |
|---|---|---|---|---|
| 2345-8340-2231 | PORT1 | VLAN1 | 1.1.1.1 | 0000-1111-0003 |

After receiving the DHCP request packet transmitted by client 1, only DHCP server 1 selected by the client 1 performs the following operations: if it is confirmed to assign the IP address 1.1.1.1 to client 1, returning a DHCP ACK packet; otherwise, returning a DHCP NACK packet, indicating that the IP address 1.1.1.1 cannot be assigned to the client 1.

Similarly, other clients in the user network 1 also perform the above IP address applying procedure. Thus, the client information table in the access layer switch may be as shown in table 6.

TABLE 6

| Original MAC address | Port identifier | VLAN ID | IP address | Proxy MAC address |
|---|---|---|---|---|
| 2345-8340-2231 | PORT1 | VLAN1 | 1.1.1.1 | 0000-1111-0003 |
| 1234-3232-2678 | PORT2 | VLAN1 | 1.1.1.2 | 0000-1111-0005 |
| 0024-E847-4264 | PORT3 | VLAN1 | 1.1.1.3 | 0000-1111-0013 |

The access layer switch receives an Ethernet packet transmitted by the client 2 via PORT2. The sender MAC address of the Ethernet packet is 1234-3232-2678. The client information table as shown in table 6 is searched according to the sender MAC address 1234-3232-2678 for a corresponding proxy MAC address. The proxy MAC address searched out is 0000-1111-0005. The sender MAC address 1234-3232-2678 of the Ethernet packet is replaced by the proxy MAC address 0000-1111-0005. Then the replaced Ethernet packet is transmitted out.

BEB1 receives the Ethernet packet transmitted by the access layer switch. The sender MAC address of the Ethernet packet is 0000-1111-0005 (i.e., the proxy MAC address). The MAC forwarding table is searched according to the sender MAC address 0000-1111-0005 for a matching item. If the matching item is not found, a MAC forwarding table item containing the sender MAC address 0000-1111-0005 is configured (or added) in the MAC forwarding table. The MAC forwarding table item may be as shown in table 7.

TABLE 7

| Target MAC address | Out-port | Serving instance |
|---|---|---|
| 0000-1111-0005 | PORT1 | Instance 1 |

Similarly, the access layer switch also receives Ethernet packets transmitted by other clients, replaces the sender MAC addresses in the Ethernet packets by corresponding proxy MAC addresses according to the above replacement method and forwards the replaced Ethernet packets. After receiving the replaced Ethernet packets transmitted by the access layer switch, BEB1 learns the sender MAC addresses carried in the Ethernet packets, wherein the sender MAC addresses are proxy MAC addresses. The MAC forwarding table in BEB1 may be as shown in table 8.

TABLE 8

| Target MAC address | Out-port | Serving instance |
|---|---|---|
| 0000-1111-0005 | PORT1 | Instance 1 |
| 0000-1111-0003 | PORT1 | Instance 1 |
| 0000-1111-0013 | PORT1 | Instance 1 |

When synchronizing the MAC forwarding table items corresponding to the MAC addresses in local user network 1 with other BEB devices BEB2-BEB4 in the SPBM network, the BEB1 aggregates the MAC forwarding table items (respectively are 0000-1111-0005, 0000-1111-0003 and 0000-1111-0013) belonging to the same MAC address segment in the MAC forwarding table as shown in table 8 into one aggregated MAC forwarding table item. The aggregated MAC forwarding table item includes: aggregated MAC address 0000-1111-0000/32, out-port PORT1 and instance 1 (see 501 in FIG. 5). The aggregated MAC address is obtained by aggregating 0000-1111-0005, 0000-1111-0003 and 0000-1111-0013. Then, an Intermediate System-to-Intermediate (IS-IS) packet carrying the aggregated MAC forwarding table item is transmitted to BEB2-BEB4.

After receiving the IS-IS packet transmitted by BEB1, other BEB devices such as BEB2, BEB3 or BEB4 search its MAC forwarding table according to the aggregated MAC address 0000-1111-0000/32 in the aggregated MAC forwarding table item carried in the IS-IS packet for a matching table item. If the matching table item is not found, a MAC forwarding table item containing the aggregated MAC address 0000-1111-0000/32 is added in the MAC forwarding table. The MAC forwarding table in BEB2, BEB3 or BEB4 may be as shown in table 9.

TABLE 9

| Target MAC address | Out-port | Serving instance |
|---|---|---|
| 0000-1111-0000/32 | SPBM tunnel port 1 | Instance 1 |

After receiving an Ethernet packet with a target MAC address 0000-1111-0003 transmitted by the access layer switch in user network 4, BEB3 searches the MAC forwarding table as shown in table 9 for the target MAC address 0000-1111-0003. If the target MAC address 0000-1111-0003 is not found, BEB3 searches the MAC forwarding table as shown in table 9 for a target MAC address which belongs to the same MAC address segment with the target MAC address 0000-1111-0003. At this time, the target MAC address 0000-1111-0000/32 is found. The out-port corresponding to 0000-1111-0000/32 is SPBM tunnel port 1. Therefore, BEB3 encapsulates the Ethernet packet into an M-in-M packet according to the SPBM tunnel port 1 and then forwards the M-in-M packet to BEB1.

After receiving the M-in-M packet, BEB1 decapsulates the M-in-M packet to obtain the Ethernet packet, searches the MAC forwarding table for the target MAC address 0000-1111-0003 of the Ethernet packet. The out-port searched out is PORT1. The Ethernet packet is transmitted to the access layer switch via PORT1.

After receiving the Ethernet packet, the access layer switch searches the client information table as shown in table 6 according to the target MAC address 0000-1111-0003 for a matching table item. The original MAC address searched out is 1234-3232-2678 and the port identifier is PORT2. Then, the target MAC address 0000-1111-0003 of the Ethernet packet is replaced by 1234-3232-2678. The replaced Ethernet packet is transmitted to client 2 via PORT2. In accordance with the above method examples, examples of the present disclosure also provide a BEB device, an access layer switch and an address assigning server.

Figure 6:
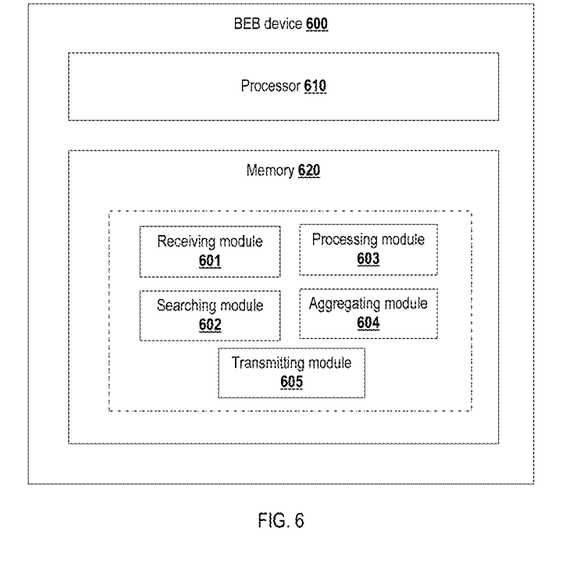
FIG. 6 is a schematic diagram illustrating a structure of a BEB device in the SPBM network according to an example of the present disclosure.

FIG. 6 is a schematic diagram illustrating a BEB device in the SPBM network according to an example of the present disclosure. As shown in FIG. 6, the BEB device includes one or more processors 610; a memory 620; and one or more program modules stored in the memory 620 and to be executed by the one or more processors 610, the one or more program modules include: a receiving module 601, a searching module 602, a processing module 603, an aggregating module 604 and a transmitting module 605. Modules may include machine readable instructions executable by a processor or hardware.

The receiving module 601 receives an Ethernet packet of a client transmitted by an access layer switch.

The searching module 602 searches, after the receiving module 601 receives the Ethernet packet of the client transmitted by the access layer switch, a MAC forwarding table according a sender MAC address of the Ethernet packet for a matching table item, wherein the sender MAC address of the Ethernet packet is a proxy MAC address assigned by an address assigning server to the client.

The processing module 603 adds, if the searching module 602 does not find the matching table item, a MAC forwarding table item including the sender MAC address of the Ethernet packet in the MAC forwarding table.

The aggregating module 604 aggregates a plurality of MAC forwarding table items belonging to the same MAC address segment in the MAC forwarding table into one aggregated MAC forwarding table item when the BEB device transmits the MAC forwarding table items to other BEB devices in the SPBM network for synchronization, wherein the MAC address in the aggregated MAC forwarding table item is the aggregated MAC address.

The transmitting module 605 transmits the aggregated MAC forwarding table item obtained by the aggregating module 604 to other BEB devices.

In one example, the aggregated MAC forwarding table item may be synchronized with other BEB devices via an IS-IS packet.

The receiving module 601 further receives an aggregated MAC forwarding table item transmitted by another BEB device in the SPBM network for synchronization.

At this time, the searching module 602 further searches the MAC forwarding table for a matching table item according to an aggregated MAC address in the aggregated MAC forwarding table item.

If the searching module 602 does not find the matching table item, the processing module 603 further adds a MAC forwarding table item corresponding to the aggregated MAC address in the MAC forwarding table.

After the receiving module 601 receives the Ethernet packet of the client transmitted by the access layer switch, the searching module 602 further searches the MAC forwarding table according to a target MAC address of the Ethernet packet.

If the searching module 602 finds the target MAC address of the Ethernet packet in the MAC forwarding table, the transmitting module 605 forwards the Ethernet packet of the client according to a MAC forwarding table item corresponding to the target MAC address of the Ethernet packet.

If the searching module 602 does not find the target MAC address of the Ethernet packet in the MAC forwarding table, the searching module 602 searches the MAC forwarding table for an aggregated MAC address which belongs to the same MAC address segment with the target MAC address of the Ethernet packet.

If the searching module 602 finds the aggregated MAC address which belongs to the same MAC address segment with the target MAC address of the Ethernet packet, the transmitting module 605 forwards the Ethernet packet according to an aggregated MAC forwarding table item corresponding to the aggregated MAC address found by the searching module 602.

Other operations and functions of the BEB device may be seen from the above method examples and are not repeated herein.

Figure 7:
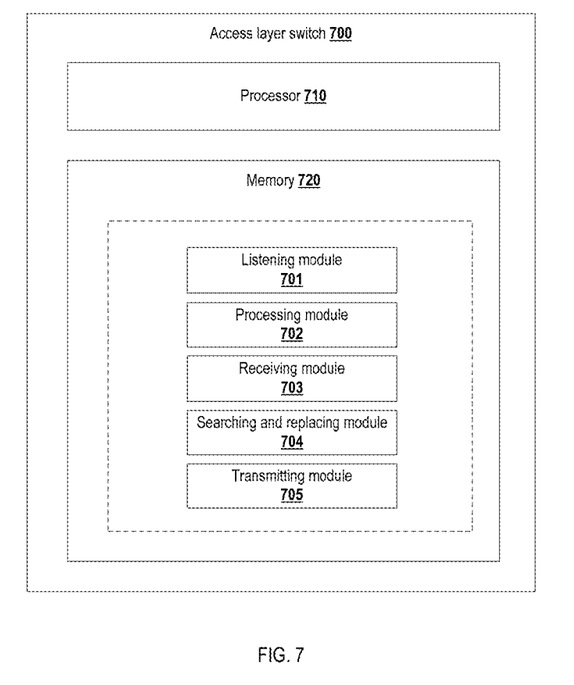
FIG. 7 is a schematic diagram illustrating a structure of an access layer switch in the SPBM network according to an example of the present disclosure.

FIG. 7 is a schematic diagram illustrating an access layer switch in the SPBM network according to an example of the present disclosure. As show in FIG. 7, the access layer switch may include one or more processors 710; a memory 720; and one or more program modules stored in the memory 720 and to be executed by the one or more processors 710, the one or more program modules include: a listening module 701, a processing module 702, a receiving module 703, a searching and replacing module 704 and a transmitting module 705.

The listening module 701 listens to protocol packets exchanged between a client and an address assigning server when the client applies for an IP address to the address assigning server.

The processing module 702 adds a table item corresponding to the client in a client information table according to the protocol packets listened by the listening module 701, wherein the table item includes: an original MAC address of the client, a port identifier of a port via which the protocol packet transmitted by the client is received, an IP address and a proxy MAC address assigned to the client by the address assigning server selected by the client.

The receiving module 703 receives an Ethernet packet transmitted by the client.

The searching and replacing module 704 searches, after the receiving module 703 receives the Ethernet packet transmitted by the client, the client information table for a corresponding proxy MAC address according to the sender MAC address of the Ethernet packet, replace the sender MAC address of the Ethernet packet with the proxy MAC address searched out.

The transmitting module 705 transmits the Ethernet packet replaced by the searching and replacing module 704 to the BEB device, such that the BEB device aggregates, before transmitting MAC forwarding table items in the BEB device to other BEB devices in the SPBM network for synchronization, a plurality of MAC forwarding table items belonging to a same MAC address segment into an aggregated MAC forwarding table item.

The receiving module 703 further receives an Ethernet packet destined to the client transmitted by the BEB device. After the receiving module 703 receives the Ethernet packet transmitted by the BEB device, the searching and replacing module 704 searches the client information table according to a target MAC address of the Ethernet packet transmitted by the BEB device for a corresponding original MAC address of the client and a port identifier, replaces the target MAC address of the Ethernet packet transmitted by the BEB device by the original MAC address searched out.

The transmitting module 705 transmits the replaced Ethernet packet to the client via a port corresponding to the port identifier searched out by the searching and replacing module 704.

Figure 8:
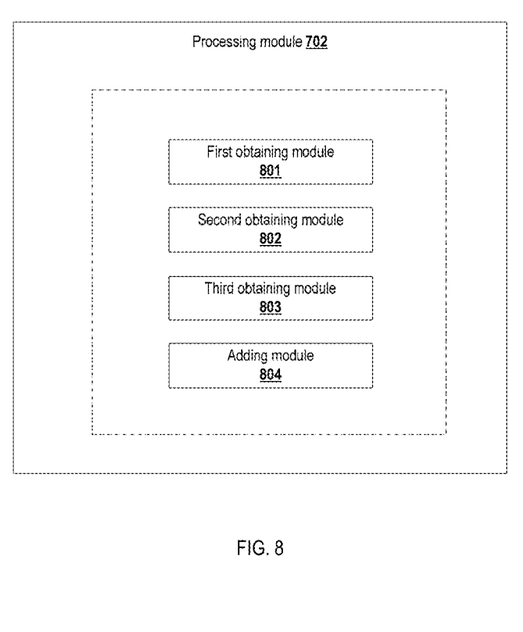
FIG. 8 is a schematic diagram illustrating a structure of a processing module of the access layer switch according to an example of the present disclosure.

If the address assigning server is a DHCP server and the above protocol packets are DHCP packets, in order to add a table item corresponding to the client in the client information table according to the DHCP packets listened by the listening module 701, the processing module 702 may further include the modules, as shown in FIG. 8. The modules include a first obtaining module 801, to obtain, after the listening module 701 detects DHCP discover packet transmitted by the client, a sender MAC address of the DHCP discover packet and a port identifier of the port via which the DHCP discover packet is received. A second obtaining module 802 obtains, after the listening module 701 detects a DHCP offer packet returned by the address assigning server in response to the DHCP discover packet, the IP address and proxy MAC address assigned by the address assigning server to the client carried in the DHCP offer packet. A third obtaining module 803 obtains, after the listening module 701 detects a DHCP request packet transmitted by the client in response to the DHCP offer packet returned by each address assigning server, the IP address assigned to the client by the address assigning server selected by the client carried in the DHCP request packet and determine the proxy MAC address corresponding to the IP address An adding module 804 adds a relationship between the sender MAC address obtained by the first obtaining module 801, the port identifier obtained by the first obtaining module 801, the IP address and the proxy MAC address obtained by the third obtaining module 803 into the client information table, wherein the sender MAC address obtained by the first obtaining module 801 is the original MAC address of the client.

The above examples may be implemented by hardware, software, firmware, or a combination thereof. For example the various methods, processes and functional modules described herein may be implemented by a processor (the term processor is to be interpreted broadly to include a CPU, processing module, ASIC, logic module, or programmable gate array, etc.). The processes, methods and functional modules may all be performed by a single processor or split between several processors; reference in this disclosure or the claims to a 'processor' should thus be interpreted to mean 'one or more processors'. The processes, methods and functional modules are implemented as machine readable instructions executable by one or more processors, hardware logic circuitry of the one or more processors or a combination thereof. Further, the examples disclosed herein may be implemented in the form of a software product. The computer software product is stored in a non-transitory storage medium and comprises a plurality of instructions for making a computer device (which may be a personal computer, a server or a network device, such as a router, switch, access point, etc.) implement the method recited in the examples of the present disclosure.

What has been described and illustrated herein is an example of the disclosure along with some of its variations. The terms, descriptions and figures used herein are set forth by way of illustration. Many variations are possible within the spirit and scope of the disclosure, which is intended to be defined by the following claims and their equivalents.

The invention claimed is:

1. A method for item aggregation in a shortest path bridging Mac-in-Mac mode (SPBM) network, wherein the SPBM network comprises a backbone edge bridge (BEB) device and a user network connected with the BEB network, wherein the user network comprises an access layer switch, a client connected with the access layer switch, and an address assigning server, and the method comprises:
   in response to receiving an Ethernet packet of the client transmitted by the access layer switch, searching at the BEB device a media access control (MAC) forwarding table according to a sender MAC address of the Ethernet packet for a matching table item, wherein the sender MAC address of the Ethernet packet is a proxy MAC address assigned to the client by the address assigning server;
   if the matching table item is not found, adding a MAC forwarding table item containing the sender MAC address in the MAC forwarding table;
   aggregating a plurality of MAC forwarding table items in the MAC forwarding table belonging to a same MAC address segment into an aggregated MAC forwarding table item; and
   transmitting the aggregated MAC forwarding table item to another BEB device, wherein a MAC address in the aggregated MAC forwarding table item is an aggregated MAC address.

2. The method of claim 1, wherein contents of each of the plurality of MAC forwarding table items in the MAC forwarding table comprise a target MAC address, an out-port and a serving instance;
   the plurality of MAC forwarding table items in the MAC forwarding table belonging to the same MAC address segment comprise a same out-port and same serving instance but different target MAC addresses; and
   the aggregated MAC forwarding table item comprises the same out-port and the same serving instance of the plurality of MAC forwarding table items and the aggregated MAC address.

3. The method of claim 1, further comprising:
   after receiving an aggregated MAC forwarding table item transmitted by the another BEB device, searching the MAC forwarding table according to an aggregated MAC address in the aggregated MAC forwarding table item transmitted by the other BEB device for a matching table item;
   if the matching table item is not found, adding in the MAC forwarding table a MAC forwarding table item corresponding to the aggregated MAC address in the aggregated MAC forwarding table item transmitted by the another BEB device.

4. The method of claim 1, further comprising:
   after receiving the Ethernet packet of the client transmitted by the access layer switch, searching the MAC forwarding table according to a target MAC address of the Ethernet packet, and if the target MAC address of the Ethernet packet is found in the MAC forwarding table, forwarding the Ethernet packet according to a MAC forwarding table item corresponding to the target MAC address of the Ethernet packet; and
   if the target MAC address of the Ethernet packet is not found in the MAC forwarding table, searching for an aggregated MAC address which belongs to the same MAC address segment with the target MAC address of the Ethernet packet, and if there is an aggregated MAC address which belongs to the same MAC address segment with the target MAC address of the Ethernet packet, forwarding the Ethernet packet according to an aggregated MAC forwarding table item corresponding to the aggregated MAC address.

5. The method of claim 1, wherein proxy MAC addresses of clients in the same user network belong to the same MAC address segment.

6. A method for item aggregation in a shortest path bridging Mac-in-Mac mode (SPBM) network, wherein the SPBM network comprises a backbone edge bridge (BEB) device and a user network connected with the BEB network; the user network comprises an access layer switch, a client connected with the access layer switch, and an address assigning server; the method applies to the access layer switch and comprises:
   listening to protocol packets exchanged between the client and the address assigning server during an IP address applying procedure, adding a table item corresponding to the client in a client information table according to the protocol packets listened; wherein the table item comprises: an original MAC address of the client, a port identifier of a port via which the protocol packets transmitted by the client are received, an IP address and a proxy MAC address assigned to the client by the address assigning server;
   after receiving an Ethernet packet transmitted by the client, searching the client information table according to a sender MAC address of the Ethernet packet for the corresponding proxy MAC address, replacing the sender MAC address of the Ethernet packet by the proxy MAC address searched out, and transmitting the replaced Ethernet packet to the BEB device; such that the BEB device aggregates, before transmitting MAC forwarding table items in the BEB device to other BEB devices in the SPBM network for synchronization, a plurality of MAC forwarding table items belonging to a same MAC address segment into an aggregated MAC forwarding table item.

7. The method of claim 6, further comprising:
   after receiving an Ethernet packet transmitted by the BEB device, searching the client information table according to a target MAC address of the Ethernet packet transmitted by the BEB device for the original MAC address and the port identifier, replacing the target MAC address of the Ethernet packet by the original MAC address searched out, and transmitting the replaced Ethernet packet to the client via a port corresponding to the port identifier searched out.

8. The method of claim 6, wherein the address assigning server is a dynamic host configuration protocol (DHCP) server, the protocol packets are DHCP packets; the adding the table item corresponding to the client in the client information table according to the listened protocol packets comprises:
   after detecting a DHCP discover packet transmitted by the client, obtaining a sender MAC address of the DHCP discover packet and the port identifier of the port via which the DHCP discover packet is received;
   after detecting a DHCP offer packet returned by the address assigning server in response to the DHCP discover packet, obtaining the IP address and the proxy MAC address assigned to the client by the address assigning server carried in the DHCP offer packet;
   after detecting a DHCP request packet transmitted by the client in response to the DHCP offer packet of the address assigning server, obtaining the IP address assigned to the client by the address assigning server carried in the DHCP request packet, and determining the proxy MAC address corresponding to the IP address; and
   adding a relationship between the sender MAC address, the port identifier, the IP address assigned by the address assigning server and the determined proxy MAC address into the client information table, wherein the sender MAC address is the original MAC address of the client.

9. The method of claim 6, wherein proxy MAC addresses of clients in the same user network belong to the same MAC address segment.

10. A backbone edge bridge (BEB) device in a shortest path bridging Mac-in-Mac mode (SPBM) network, wherein the SPBM network comprises: the BEB device and a user network connected with the BEB device; the user network comprises an access layer switch, a client connected with the access layer switch, and an address assigning server; the BEB device comprises:
   one or more processors;
   a memory; and
   one or more program modules stored in the memory and to be executed by the one or more processors, the one or more program modules include:
      a receiving module, to receive an Ethernet packet transmitted by an access layer switch;
      a searching module, to search, after the receiving module receives the Ethernet packet of a client transmitted by the access layer switch, a MAC forwarding table according a sender MAC address of the Ethernet packet for a matching table item, wherein the sender MAC address of the Ethernet packet is a proxy MAC address assigned by an address assigning server to the client;
      a processing module, to add, if the searching module does not find the matching table item, a MAC forwarding table item including the sender MAC address of the Ethernet packet in the MAC forwarding table;
      an aggregating module, to aggregate a plurality of MAC forwarding table items belonging to the same MAC address segment in the MAC forwarding table into an aggregated MAC forwarding table item when the BEB device transmits the MAC forwarding table items to other BEB devices in the SPBM network for synchronization, wherein the MAC address in the aggregated MAC forwarding table item is the aggregated MAC address; and
      a transmitting module, to transmit the aggregated MAC forwarding table item obtained by the aggregating module to other BEB devices for synchronization.

11. The BEB device of claim 10, wherein
   the receiving module is further to receive an aggregated MAC forwarding table item transmitted by another BEB device in the SPBM network for synchronization;
   the searching module is further to search the MAC forwarding table according to the aggregated MAC address in the aggregated MAC forwarding table item transmitted by the other BEB device for a matching table item;
   the processing module is further to add, if the searching module does not find the matching table item, in the MAC forwarding table a MAC forwarding table item corresponding to the aggregated MAC address in the aggregated MAC forwarding table item transmitted by the other BEB device.

12. The BEB device of claim 11, wherein the searching module is further to search the MAC forwarding table according to a target MAC address of the Ethernet packet after the receiving module receives the Ethernet packet of the client transmitted by the access layer switch;

the transmitting module is further to forward the Ethernet packet according to a MAC forwarding table item corresponding to the target MAC address of the Ethernet packet if the searching module finds the target MAC address of the Ethernet packet in the MAC forwarding table;

the searching module is further to search, if the searching module does not find the target MAC address of the Ethernet packet in the MAC forwarding table, for an aggregated MAC address which belongs to the same MAC address segment with the target MAC address of the Ethernet packet;

the transmitting module is further to forward, if the searching module finds the aggregated MAC address which belongs to the same MAC address segment with the target MAC address of the Ethernet packet, the Ethernet packet according to an aggregated MAC forwarding table item corresponding to the aggregated MAC address.

13. An access layer switch in a shortest path bridging Mac-in-Mac mode (SPBM) network, wherein the SPBM network comprises: the BEB device and a user network connected with the BEB device; the user network comprises an access layer switch, a client connected with the access layer switch, and an address assigning server; the access layer switch comprises:

one or more processors;

a memory; and one or more program modules stored in the memory and to be executed by the one or more processors, the one or more program modules include:

a listening module, to listen to protocol packets exchanged between a client and an address assigning server when the client applies for an IP address to the address assigning server;

a processing module, to add a table item corresponding to the client in a client information table according to the protocol packets listened by the listening module, wherein the table item comprises: an original MAC address of the client, a port identifier of a port via which the protocol packet transmitted by the client is received, an IP address and a proxy MAC address assigned to the client by the address assigning server;

a receiving module, to receive an Ethernet packet transmitted by the client;

a searching and replacing module, to search, after the receiving module receives the Ethernet packet transmitted by the client, the client information table for a corresponding proxy MAC address according to the sender MAC address of the Ethernet packet, replace the sender MAC address of the Ethernet packet with the proxy MAC address searched out; and a transmitting module, to transmit the Ethernet packet replaced by the searching and replacing module to the BEB device, such that the BEB device aggregates, before transmitting MAC forwarding table items in the BEB device to other BEB devices in the SPBM network for synchronization, a plurality of MAC forwarding table items belonging to a same MAC address segment into an aggregated MAC forwarding table item.

14. The access layer switch of claim 13, wherein the receiving module is further to receive an Ethernet packet transmitted by the BEB device;

the searching and replacing module is further to search the client information table according to a target MAC address of the Ethernet packet transmitted by the BEB device for the original MAC address and the port identifier, replace the target MAC address of the Ethernet packet transmitted by the BEB device by the original MAC address searched out;

the transmitting module is further to transmit the replaced Ethernet packet to the client via a port corresponding to the port identifier searched out.

15. The access layer switch of claim 13, wherein the address assigning server is a dynamic host configuration protocol (DHCP) server, the protocol packets are DHCP packets, the processing module further comprises:

a first obtaining module, to obtain, after the listening module detects DHCP discover packet transmitted by the client, a sender MAC address of the DHCP discover packet and a port identifier of the port via which the DHCP discover packet is received;

a second obtaining module, to obtain, after the listening module detects a DHCP offer packet returned by the address assigning server in response to the DHCP discover packet, the IP address and proxy MAC address assigned by the address assigning server to the client carried in the DHCP offer packet;

a third obtaining module, to obtain, after the listening module detects a DHCP request packet transmitted by the client in response to the DHCP offer packet returned by each address assigning server, the IP address assigned to the client by the address assigning server selected by the client carried in the DHCP request packet and determine the proxy MAC address corresponding to the IP address; and an adding module, to add a relationship between the sender MAC address obtained by the first obtaining module, the port identifier obtained by the first obtaining module, the IP address and the proxy MAC address obtained by the third obtaining module into the client information table, wherein the sender MAC address obtained by the first obtaining module is the original MAC address of the client.

\* \* \* \* \*